United States Patent
Zeppenfeld et al.

(10) Patent No.: US 9,571,652 B1
(45) Date of Patent: Feb. 14, 2017

(54) ENHANCED DIARIZATION SYSTEMS, MEDIA AND METHODS OF USE

(75) Inventors: Torsten Zeppenfeld, Emerald Hills, CA (US); Richard Gutierrez, San Jose, CA (US); Lisa Guerra, Los Altos, CA (US); Andrew S. Efron, San Mateo, CA (US); Anthony Rajakumar, Fremont, CA (US)

(73) Assignee: VERINT AMERICAS INC., Alpharetta, GA (US)

( * ) Notice: Subject to any disclaimer, the term of this patent is extended or adjusted under 35 U.S.C. 154(b) by 603 days.

(21) Appl. No.: 13/442,767

(22) Filed: Apr. 9, 2012

Related U.S. Application Data

(63) Continuation-in-part of application No. 13/290,011, filed on Nov. 4, 2011, now Pat. No. 8,793,131, and a continuation-in-part of application No. 11/754,975, filed on May 29, 2007, now abandoned, application No. 13/442,767, which is a continuation-in-part of application No. 12/352,530, filed on Jan. 12, 2009, now Pat. No. 8,924,285, application No. 13/442,767, which is a continuation-in-part of application No. 12/856,200, filed on Aug. 13, 2010, application No. 13/442,767, which is a continuation-in-part of application No. 12/856,118, filed on Aug. 13, 2010, now Pat. No. 8,930,261, application No. 13/442,767, which is a continuation-in-part of application No.

(Continued)

(51) Int. Cl.
 *H04M 3/523* (2006.01)
(52) U.S. Cl.
 CPC .................... *H04M 3/523* (2013.01)
(58) Field of Classification Search
 CPC ................................................. H04M 3/523
 USPC ..... 379/88.01–88.04, 114.14, 265.01–266.1; 381/17; 704/260, 272, 246, 273; 705/38; 370/521

See application file for complete search history.

(56) References Cited

U.S. PATENT DOCUMENTS

| | | | |
|---|---|---|---|
| 4,653,097 A | 3/1987 | Watanabe et al. | |
| 4,864,566 A * | 9/1989 | Chauveau | H04J 3/18 370/521 |

(Continued)

FOREIGN PATENT DOCUMENTS

| | | |
|---|---|---|
| EP | 0598469 | 5/1994 |
| JP | 2004/193942 | 7/2004 |

(Continued)

OTHER PUBLICATIONS

Baum, L.E., et al., "A Maximization Technique Occurring in the Statistical Analysis of Probabilistic Functions of Markov Chains," The Annals of Mathematical Statistics, vol. 41, No. 1, 1970, pp. 164-171.

(Continued)

*Primary Examiner* — Md S Elahee
(74) *Attorney, Agent, or Firm* — Meunier Carlin & Curfman

(57) ABSTRACT

Enhanced diarization systems and methods of use are provided herein. Some exemplary methods may include applying one or more rules that affect separation of the call audio data into segments, the rules being associated with the at least one call schema, separating the call audio data into segments according to the one or more rules, grouping segments of call audio data associated with a speaker, and storing in a storage media an identifier and the grouped segments for the speaker.

11 Claims, 5 Drawing Sheets

Related U.S. Application Data

12/856,037, filed on Aug. 13, 2010, now Pat. No. 8,510,215, application No. 13/442,767, which is a continuation-in-part of application No. 11/404,342, filed on Apr. 14, 2006, application No. 13/442,767, which is a continuation-in-part of application No. 13/278,067, filed on Oct. 20, 2011, now Pat. No. 8,311,826, which is a continuation of application No. 11/754,974, filed on May 29, 2007, now Pat. No. 8,073,691, which is a continuation-in-part of application No. 11/404,342, filed on Apr. 14, 2006, application No. 13/442,767, which is a continuation-in-part of application No. 13/415,816, filed on Mar. 8, 2012, now Pat. No. 8,903,859, and a continuation-in-part of application No. 13/415,809, filed on Mar. 8, 2012.

(60) Provisional application No. 60/808,892, filed on May 30, 2006, provisional application No. 60/923,195, filed on Apr. 13, 2007, provisional application No. 61/197,848, filed on Oct. 31, 2008, provisional application No. 61/010,701, filed on Jan. 11, 2008, provisional application No. 61/335,677, filed on Jan. 11, 2010, provisional application No. 60/673,472, filed on Apr. 21, 2005.

(56) References Cited

U.S. PATENT DOCUMENTS

| | | | |
|---|---|---|---|
| 5,027,407 A | 6/1991 | Tsunoda | |
| 5,222,147 A * | 6/1993 | Koyama | G10L 15/22 704/249 |
| 5,638,430 A | 6/1997 | Hogan et al. | |
| 5,805,674 A | 9/1998 | Anderson, Jr. | |
| 5,907,602 A | 5/1999 | Peel et al. | |
| 5,946,654 A | 8/1999 | Newman et al. | |
| 5,963,908 A | 10/1999 | Chadha | |
| 5,999,525 A | 12/1999 | Krishnaswamy et al. | |
| 6,044,382 A | 3/2000 | Martino | |
| 6,145,083 A | 11/2000 | Shaffer et al. | |
| 6,266,640 B1 | 7/2001 | Fromm | |
| 6,275,806 B1 * | 8/2001 | Pertrushin | 704/272 |
| 6,427,137 B2 | 7/2002 | Petrushin | |
| 6,480,825 B1 | 11/2002 | Sharma et al. | |
| 6,510,415 B1 | 1/2003 | Talmor et al. | |
| 6,587,552 B1 | 7/2003 | Zimmermann | |
| 6,597,775 B2 | 7/2003 | Lawyer et al. | |
| 6,915,259 B2 | 7/2005 | Rigazio | |
| 7,006,605 B1 | 2/2006 | Morganstein et al. | |
| 7,039,951 B1 | 5/2006 | Chaudhari et al. | |
| 7,054,811 B2 | 5/2006 | Barzilay | |
| 7,106,843 B1 | 9/2006 | Gainsboro et al. | |
| 7,158,622 B2 | 1/2007 | Lawyer et al. | |
| 7,212,613 B2 | 5/2007 | Kim et al. | |
| 7,299,177 B2 | 11/2007 | Broman et al. | |
| 7,386,105 B2 | 6/2008 | Wasserblat et al. | |
| 7,403,922 B1 | 7/2008 | Lewis et al. | |
| 7,539,290 B2 | 5/2009 | Ortel | |
| 7,657,431 B2 | 2/2010 | Hayakawa | |
| 7,660,715 B1 | 2/2010 | Thambiratnam | |
| 7,668,769 B2 | 2/2010 | Baker et al. | |
| 7,693,965 B2 | 4/2010 | Rhoads | |
| 7,778,832 B2 | 8/2010 | Broman et al. | |
| 7,822,605 B2 | 10/2010 | Zigel et al. | |
| 7,908,645 B2 | 3/2011 | Varghese et al. | |
| 7,940,897 B2 | 5/2011 | Khor et al. | |
| 8,036,892 B2 | 10/2011 | Broman et al. | |
| 8,073,691 B2 | 12/2011 | Rajakumar | |
| 8,112,278 B2 | 2/2012 | Burke | |
| 8,145,562 B2 | 3/2012 | Wasserblat et al. | |
| 8,311,826 B2 | 11/2012 | Rajakumar | |
| 8,510,215 B2 | 8/2013 | Gutierrez | |
| 8,537,978 B2 | 9/2013 | Jaiswal et al. | |
| 9,001,976 B2 | 4/2015 | Arrowood | |
| 2001/0026632 A1 | 10/2001 | Tamai | |
| 2002/0022474 A1 | 2/2002 | Blom et al. | |
| 2002/0099649 A1 | 7/2002 | Lee et al. | |
| 2003/0009333 A1 | 1/2003 | Sharma et al. | |
| 2003/0050780 A1 | 3/2003 | Rigazio | |
| 2003/0050816 A1 | 3/2003 | Givens et al. | |
| 2003/0097593 A1 | 5/2003 | Sawa et al. | |
| 2003/0147516 A1 | 8/2003 | Lawyer et al. | |
| 2003/0208684 A1 | 11/2003 | Camacho et al. | |
| 2004/0029087 A1 | 2/2004 | White | |
| 2004/0111305 A1 | 6/2004 | Gavan et al. | |
| 2004/0131160 A1 | 7/2004 | Mardirossian | |
| 2004/0143635 A1 | 7/2004 | Galea | |
| 2004/0167964 A1 | 8/2004 | Rounthwaite et al. | |
| 2004/0203575 A1 | 10/2004 | Chin et al. | |
| 2004/0240631 A1 | 12/2004 | Broman et al. | |
| 2005/0010411 A1 | 1/2005 | Rigazio | |
| 2005/0043014 A1 | 2/2005 | Hodge | |
| 2005/0076084 A1 | 4/2005 | Loughmiller et al. | |
| 2005/0125226 A1 | 6/2005 | Magee | |
| 2005/0125339 A1 | 6/2005 | Tidwell et al. | |
| 2005/0185779 A1 | 8/2005 | Toms | |
| 2006/0013372 A1 | 1/2006 | Russell | |
| 2006/0106605 A1 | 5/2006 | Saunders et al. | |
| 2006/0149558 A1 | 7/2006 | Kahn | |
| 2006/0161435 A1 | 7/2006 | Atef et al. | |
| 2006/0212407 A1 | 9/2006 | Lyon | |
| 2006/0212925 A1 | 9/2006 | Shull et al. | |
| 2006/0248019 A1 | 11/2006 | Rajakumar | |
| 2006/0251226 A1 | 11/2006 | Hogan et al. | |
| 2006/0282660 A1 | 12/2006 | Varghese et al. | |
| 2006/0285665 A1 * | 12/2006 | Wasserblat et al. | 379/114.14 |
| 2006/0289622 A1 | 12/2006 | Khor et al. | |
| 2006/0293891 A1 | 12/2006 | Pathuel | |
| 2007/0041517 A1 | 2/2007 | Clarke et al. | |
| 2007/0071206 A1 | 3/2007 | Gainsboro et al. | |
| 2007/0074021 A1 | 3/2007 | Smithies et al. | |
| 2007/0100608 A1 | 5/2007 | Gable et al. | |
| 2007/0124246 A1 | 5/2007 | Lawyer et al. | |
| 2007/0244702 A1 * | 10/2007 | Kahn et al. | 704/260 |
| 2007/0280436 A1 | 12/2007 | Rajakumar | |
| 2007/0282605 A1 | 12/2007 | Rajakumar | |
| 2007/0288242 A1 | 12/2007 | Spengler | |
| 2008/0010066 A1 | 1/2008 | Broman et al. | |
| 2008/0181417 A1 * | 7/2008 | Pereg et al. | 381/17 |
| 2008/0195387 A1 | 8/2008 | Zigel et al. | |
| 2008/0222734 A1 | 9/2008 | Redlich et al. | |
| 2008/0240282 A1 | 10/2008 | Lin | |
| 2009/0046841 A1 | 2/2009 | Hodge | |
| 2009/0106846 A1 | 4/2009 | Dupray et al. | |
| 2009/0119106 A1 | 5/2009 | Rajakumar et al. | |
| 2009/0147939 A1 | 6/2009 | Morganstein et al. | |
| 2009/0247131 A1 | 10/2009 | Champion et al. | |
| 2009/0254971 A1 | 10/2009 | Herz et al. | |
| 2009/0319269 A1 | 12/2009 | Aronowitz | |
| 2010/0228656 A1 | 9/2010 | Wasserblat et al. | |
| 2010/0303211 A1 | 12/2010 | Hartig et al. | |
| 2010/0305946 A1 | 12/2010 | Gutierrez et al. | |
| 2010/0305960 A1 | 12/2010 | Gutierrez et al. | |
| 2011/0004472 A1 | 1/2011 | Zlokarnik | |
| 2011/0026689 A1 | 2/2011 | Metz et al. | |
| 2011/0119060 A1 | 5/2011 | Aronowitz | |
| 2011/0161078 A1 | 6/2011 | Droppo et al. | |
| 2011/0191106 A1 | 8/2011 | Khor et al. | |
| 2011/0255676 A1 | 10/2011 | Marchand et al. | |
| 2011/0282661 A1 | 11/2011 | Dobry et al. | |
| 2011/0282778 A1 * | 11/2011 | Wright et al. | 705/38 |
| 2011/0320484 A1 | 12/2011 | Smithies et al. | |
| 2012/0053939 A9 | 3/2012 | Gutierrez et al. | |
| 2012/0054202 A1 | 3/2012 | Rajakumar | |
| 2012/0072453 A1 | 3/2012 | Guerra et al. | |
| 2012/0253805 A1 | 10/2012 | Rajakumar et al. | |
| 2012/0254243 A1 | 10/2012 | Zeppenfeld et al. | |
| 2012/0263285 A1 | 10/2012 | Rajakumar et al. | |
| 2012/0284026 A1 | 11/2012 | Cardillo et al. | |
| 2013/0163737 A1 | 6/2013 | Dement et al. | |
| 2013/0197912 A1 | 8/2013 | Hayakawa et al. | |

(56) References Cited

U.S. PATENT DOCUMENTS

| | | |
|---|---|---|
| 2013/0253919 A1 | 9/2013 | Gutierrez et al. |
| 2013/0300939 A1 | 11/2013 | Chou et al. |
| 2014/0067394 A1 | 3/2014 | Abuzeina |
| 2014/0142940 A1 | 5/2014 | Ziv et al. |
| 2015/0055763 A1 | 2/2015 | Guerra et al. |

FOREIGN PATENT DOCUMENTS

| | | |
|---|---|---|
| JP | 2006038955 | 9/2006 |
| WO | 0077772 | 12/2000 |
| WO | 2004/079501 | 9/2004 |
| WO | 2006013555 | 2/2006 |
| WO | 2007001452 | 1/2007 |

OTHER PUBLICATIONS

Cheng, Y., "Mean Shift, Mode Seeking, and Clustering," IEEE Transactions on Pattern Analysis and Machine Intelligence, vol. 17, No. 8, 1995, pp. 790-799.

Cohen, I., "Noise Spectrum Estimation in Adverse Environment: Improved Minima Controlled Recursive Averaging," IEEE Transactions On Speech and Audio Processing, vol. 11, No. 5, 2003, pp. 466-475.

Cohen, I., et al., "Spectral Enhancement by Tracking Speech Presence Probability in Subbands," Proc. International Workshop in Hand-Free Speech Communication (HSC'01), 2001, pp. 95-98.

Coifman, R.R., et al., "Diffusion maps," Applied and Computational Harmonic Analysis, vol. 21, 2006, pp. 5-30.

Hayes, M.H., "Statistical Digital Signal Processing and Modeling," J. Wiley & Sons, Inc., New York, 1996, 200 pages.

Hermansky, H., "Perceptual linear predictive (PLP) analysis of speech," Journal of the Acoustical Society of America, vol. 87, No. 4, 1990, pp. 1738-1752.

Lailler, C., et al., "Semi-Supervised and Unsupervised Data Extraction Targeting Speakers: From Speaker Roles to Fame?," Proceedings of the First Workshop on Speech, Language and Audio in Multimedia (SLAM), Marseille, France, 2013, 6 pages.

Mermelstein, P., "Distance Measures for Speech Recognition—Psychological and Instrumental," Pattern Recognition and Artificial Intelligence, 1976, pp. 374-388.

Schmalenstroeer, J., et al., "Online Diarization of Streaming Audio-Visual Data for Smart Environments," IEEE Journal of Selected Topics in Signal Processing, vol. 4, No. 5, 2010, 12 pages.

Viterbi, a.J., "Error Bounds for Convolutional Codes and an Asymptotically Optimum Decoding Algorithm," IEEE Transactions on Information Theory, vol. 13, No. 2, 1967, pp. 260-269.

* cited by examiner

ENHANCED DIARIZATION SYSTEMS, MEDIA AND METHODS OF USE

CROSS-REFERENCE TO RELATED APPLICATIONS

This application is a continuation-in-part and claims benefit of and priority to U.S. patent application Ser. No. 13/290,011, filed on Nov. 4, 2011, entitled "SYSTEMS, METHODS, AND MEDIA FOR DETERMINING FRAUD PATTERNS AND CREATING FRAUD BEHAVIORAL MODELS," which is a continuation-in-part of U.S. Pat. No. 8,073,691 filed on May 29, 2007, entitled "METHOD AND SYSTEM FOR SCREENING USING VOICE DATA AND METADATA," which in turn claims the benefit of and priority to U.S. Provisional Applications 60/923,195, filed on Apr. 13, 2007, entitled "Seeding Techniques and Geographical Optimization Details for a Fraud Detection System that uses Voiceprints," and 60/808,892, filed on May 30, 2006, entitled "Optimizations for a Fraud Detection System that uses Voiceprints."

This application is also a continuation-in-part and claims benefit of and priority to U.S. patent application Ser. No. 11/754,975, filed on May 29, 2007, entitled "Method and System to Seed a Voice Database," which in turn claims the benefit of and priority to U.S. Provisional Applications 60/923,195, filed on Apr. 13, 2007, entitled "Seeding Techniques and Geographical Optimization Details for a Fraud Detection System that uses Voiceprints," and 60/808,892, filed on May 30, 2006, entitled "Optimizations for a Fraud Detection System that uses Voiceprints."

This application is also a continuation-in-part and claims benefit of and priority to U.S. patent application Ser. No. 12/352,530, filed on Jan. 12, 2009, entitled "BUILDING WHITELISTS COMPRISING VOICEPRINTS NOT ASSOCIATED WITH FRAUD AND SCREENING CALLS USING A COMBINATION OF A WHITELIST AND BLACKLIST," which in turn claims the benefit of and priority to U.S. Provisional Applications 61/197,848, filed Oct. 31, 2008, entitled "Voice biometrics based fraud management system," and 61/010,701, filed Jan. 11, 2008, entitled "Optimizations & extensions of a system to detect fraud using voiceprints."

This application is also a continuation-in-part and claims benefit of and priority to U.S. patent application Ser. No. 12/856,200, filed on Aug. 13, 2010, entitled "SPEAKER VERIFICATION-BASED FRAUD SYSTEM FOR COMBINED AUTOMATED RISK SCORE WITH AGENT REVIEW AND ASSOCIATED USER INTERFACE," which in turn claims the benefit of and priority to U.S. Provisional Application 61/335,677, filed on Jan. 11, 2010, entitled "Method for correlating fraud audio to textual fraud reports using word spotting."

This application is also a continuation-in-part and claims benefit of and priority to U.S. patent application Ser. No. 12/856,118, filed on Aug. 13, 2010, entitled "METHOD AND SYSTEM FOR GENERATING A FRAUD RISK SCORE USING TELEPHONY CHANNEL BASED AUDIO AND NON-AUDIO DATA," which in turn claims the benefit of and priority to U.S. Provisional Applications 61/335,677, filed on Jan. 11, 2010, entitled "Method for correlating fraud audio to textual fraud reports using word spotting."

This application is also a continuation-in-part and claims benefit of and priority to U.S. patent application Ser. No. 12/856,037, filed on Aug. 13, 2010, entitled "METHOD AND SYSTEM FOR ENROLLING A VOICEPRINT IN A FRAUDSTER DATABASE," which in turn claims the benefit of and priority to U.S. Provisional Applications 61/335,677, filed on Jan. 11, 2010, entitled "Method for correlating fraud audio to textual fraud reports using word spotting."

This application and each of the aforementioned Non-Provisional U.S. Patent Applications is a continuation-in-part and claims benefit of and priority to U.S. patent application Ser. No. 11/404,342, filed on Apr. 14, 2006, entitled "Method and system to detect fraud using voice data," which in turn claims the benefit of U.S. Provisional Application 60/673,472, filed on Apr. 21, 2005, entitled "Detecting Fraudulent Use of Financial Account Numbers Using Voiceprints."

This application is also a continuation-in-part and claims the benefit of and priority to U.S. patent application Ser. No. 13/278,067, filed on Oct. 20, 2011, entitled "Method and System for Screening Using Voice Data and Metadata," which in turn is a continuation of and claims the benefit of and priority to U.S. patent application Ser. No. 11/754,974, filed on May 29, 2007, entitled "METHOD AND SYSTEM FOR SCREENING USING VOICE DATA AND METADATA," which in turn claims the benefit of and priority to U.S. Provisional Applications 60/923,195, filed on Apr. 13, 2007, entitled "Seeding Techniques and Geographical Optimization Details for a Fraud Detection System that uses Voiceprints," and 60/808,892, filed on May 30, 2006, entitled "Optimizations for a Fraud Detection System that uses Voiceprints." U.S. patent application Ser. No. 11/754,974 is a continuation-in-part and claims benefit of and priority to U.S. patent application Ser. No. 11/404,342, filed on Apr. 14, 2006, entitled "Method and system to detect fraud using voice data," which in turn claims the benefit of U.S. Provisional Application 60/673,472, filed on Apr. 21, 2005, entitled "Detecting Fraudulent Use of Financial Account Numbers Using Voiceprints."

This application is also a continuation-in-part and claims benefit of and priority to U.S. patent application Ser. No. 13/415,816, filed Mar. 8, 2012, entitled "SYSTEMS, METHODS, AND MEDIA FOR GENERATING HIERARCHICAL FUSED RISK SCORES," and is also a continuation-in-part and claims benefit of and priority to U.S. patent application Ser. No. 13/415,809, filed Mar. 8, 2012, entitled "SYSTEMS, METHODS, AND MEDIA FOR DETERMINING FRAUD RISK FROM AUDIO SIGNALS." All of above applications and patents are hereby incorporated by reference herein in their entirety.

FIELD OF THE TECHNOLOGY

Embodiments of the disclosure relate to methods and systems for diarization of call data for use with a fraud detection system. The enhanced diarization technologies provided herein may be utilized to identify unique individuals speaking within a single audio data file by determining characteristics of the call audio data and applying rules to the call audio data that are based upon business logic of an enterprise. The separated audio can then more efficiently be used to identify an individual.

BACKGROUND

Often, fraudsters perpetrate fraudulent actions against an enterprise via a telephonic interaction with the enterprise. Fraud detection systems may process the telephonic interaction as a single audio source comprising multiple speakers. Separating the speakers can be difficult.

SUMMARY

According to some embodiments, the present technology may be directed to methods for diarizing call data. The methods may include: (a) applying one or more rules that affect separation of the call audio data into segments, the rules being associated with at least one call schema; (b) separating the call audio data into segments according to the one or more rules; (c) grouping segments of call audio data associated with a speaker, and (d) storing in a storage media an identifier and a group of segments for the speaker.

According to other embodiments, the present technology may be directed to methods for processing call data. The methods may include: (a) receiving a stream of call audio data collected during a call event from a client device; (b) determining at least one call schema for call audio data; (c) diarizing the call audio data by: (i) applying one or more rules that affect separation of the call audio data into segments, the rules being associated with the at least one call schema; and (ii) separating the call audio data into segments according to the one or more rules, each segment being associated with a unique speaker; (iii) grouping the segments; (d) comparing a segment group to fraud profiles associated with known fraudsters; and (f) returning, before the end of the call event, notification to the client device if the segment group substantially corresponds to a fraud profile associated with a known fraudster.

According to other embodiments, the present technology may be directed to systems for diarizing call data. The systems may include: (a) a memory for storing executable instructions that diarize call data; (b) a processor that executes the instructions; (c) an analysis module stored in memory and executable by the processor to apply at least one call schema for call audio data; (d) a diarization module stored in memory and executable by the processor to diarize the call audio data by: (i) applying one or more rules that affect separation of the call audio data into segments, the rules being associated with the at least one call schema; and (ii) separating the call audio data into segments according to the one or more rules; (d) an audio grouping module stored in memory and executable by the processor that groups segments of call audio data associated with a speaker; and (e) a database module stored in memory and executable by the processor to store in a storage media an identifier and the grouped segments for the speaker.

According to additional embodiments, the present technology may be directed to computer readable storage media for disambiguating call data. The storage media may include a program embodied thereon, the program being executable by a processor to perform a method for diarizing call data, the method may include: (a) applying one or more rules that affect separation of the call audio data into segments, the rules being associated with at least one call schema; (b) separating the call audio data into segments according to the one or more rules; (c) grouping segments of call audio data associated with a speaker, and (d) storing in a storage media an identifier and the grouped segments for the speaker.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
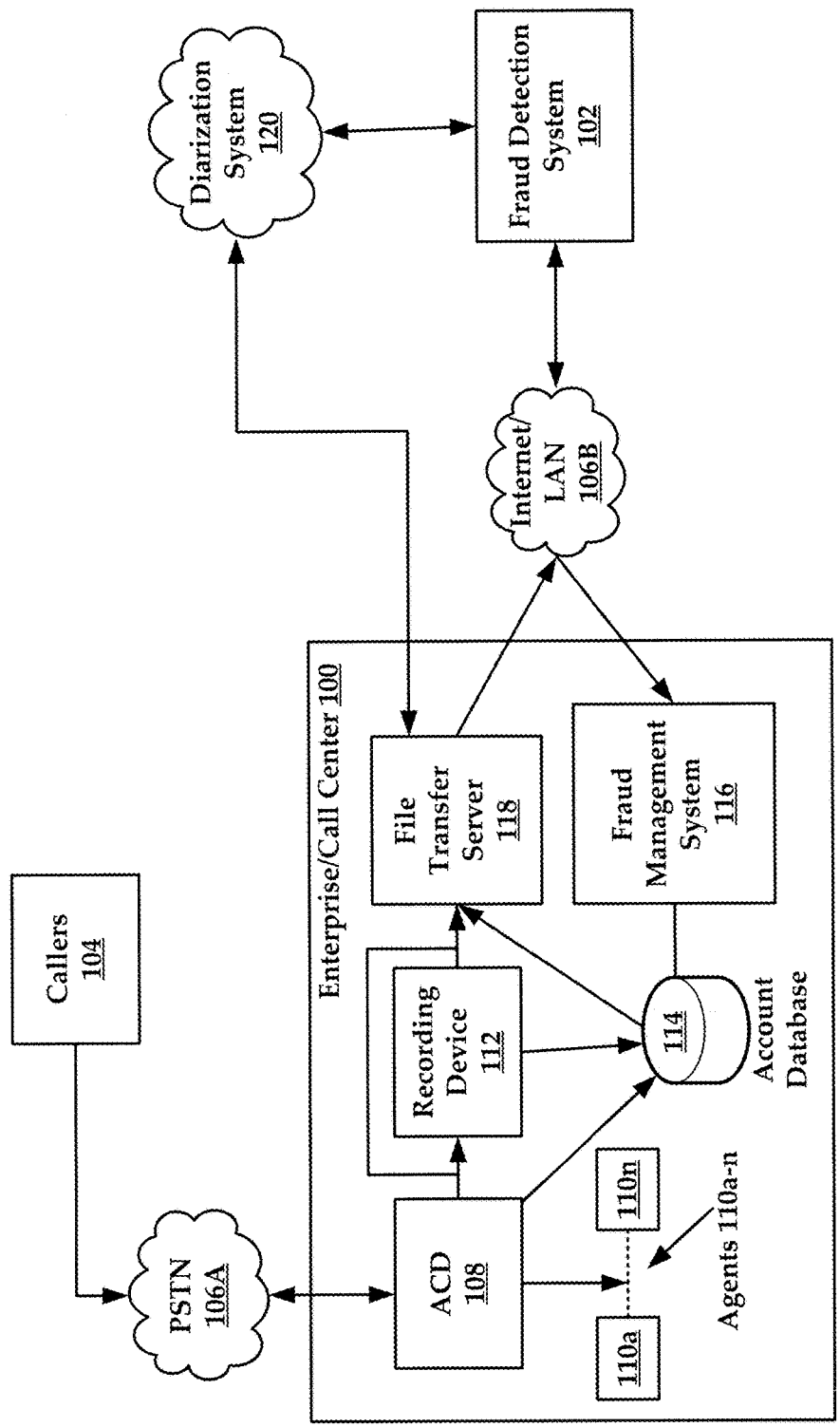
FIG. 1 is a block diagram illustrating an exemplary system for practicing aspects of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown in block diagram form only in order to avoid obscuring the disclosure.

Broadly speaking, the present technology may be directed to the diarization of call audio data, and for the use of diarized call audio data within fraud detection systems and processes. Generally, fraudsters may perpetrate fraudulent actions against an enterprise via telephonic interaction with the enterprise. Often times, fraudsters may attempt to gain control of a legitimate customer account, or may attempt to establish a new account that can be used as a means for perpetrating fraudulent activities.

When attempting to gain control of a legitimate account, the fraudster may contact the enterprise telephonically and engage with a customer service agent (or any other agent) to modify the account in such a way that the fraudster may use the account for fraudulent purposes. For example, the fraudster may attempt to change the billing address associated with the account to ensure that products are redirected to an address used by the fraudster. Other types of fraudulent activities may be more subtle in their execution and manner of detection.

As background, each time (or according to established business rules for the enterprise) an inbound or outbound telephone call occurs with an enterprise, the telephone call may be recorded and data associated with the telephone call may be memorialized in the customer account record by the customer agent facilitating the telephone call. A call data event may be understood to include both the call audio data associated with a telephone call, as well as the call non-audio data that is determined from the call. Exemplary non-audio data may include, but is not limited to, an automatic number identification (ANI), caller identification information, an international mobile equipment identity number, a given name, the timestamp associated with the call data event, keywords included in the call data event, and combinations thereof. Advantageously, data may be collected automatically by various mechanisms within the present technology, or may be collected and recorded by call center agents, such as customer service agents.

In general, call audio data for a call event may be recorded to a single channel (e.g., mono channel) and stored as an audio file. The audio file may include individual segments that belong to different speakers. That is, a natural chronological progression of a call event may include various segments where individuals such as agents, customers, or fraudsters take turns engaging one another in a conversational manner. For example a call center agent and a customer may engage in a dialog wherein the speakers alternate talking to each other.

Generic diarization techniques may be utilized to separate segments and identify the segments as belonging to a unique speaker. However, these generic diarization techniques may separate call audio data based upon analysis of the call audio data using voice recognition technologies that have limited accuracy. In addition to improving speed, rule based diarization can increase the accuracy of the diarization, since known non-audio information may be brought to bear.

Complications encountered during diarization may stem from high volume of call events encountered by an enterprise, causing the enterprise to utilize compression techniques to reduce the file size of call audio data. Such techniques may lead to degradation of the quality of the call audio data, which in turn, complicates generic diarization techniques. Other complications may arise as the number of unique speakers in the call audio data increases.

The present technology may leverage business logic to increase the efficacy of diarization processes. For example, the present technology may generate different types of call schemas that comprise rules that may be applied to the diarization process to streamline the diarization process. For example, some business rules may be applied to the diarization of the call audio data to quickly determine the role of a speaker (e.g., agent, customer). Non-limiting examples of business rules that may be applied to the diarization include an appreciation for the chronological nature of different types of call events. In one instance, outbound call events from the enterprise indicate that the first speaker will probably be the customer. In another instance, inbound call events often begin with the call center agent as the first speaker.

Additionally, efficient determination of call audio data may reduce the need to evaluate an entire call audio file. Other exemplary advantages may include the generation and management of the call schema, along with methods for matching call audio data received from an enterprise to a suitable call schema, or in some embodiments, multiple call schemas.

Often, the goal of diarization is to remove segments that include the call center agent's voice for purposes of selecting segments including the incoming customer voice. The selected segments may then be concatenated and/or a voice model may extracted from the customer segments. The present technology may generate and manage agent voice models that may be stored in a database. Call audio data may be compared against the agent voice models in the database and the comparison may be utilized as the basis to remove audio segments that are determined to belong to call center agents, further increasing the efficiency of subsequent diarization and/or fraud detection processes.

Additionally, the present technology may diarize call audio data in near real-time and return a fraud indicator for the call audio data during the duration of the call event. In this way, call center agents may receive notification that a caller with which they are currently engaged may be a suspected or confirmed fraudster. Such a determination may allow the call center agent to terminate the call before the fraudster is allowed to commit a fraudulent act, or may allow the call center agent to obtain additional information from the fraudster that may be stored in a fraudster record.

These and other advantages of the present technology are described infra with reference to the collective drawings, FIGS. 1-5.

Referring now to FIG. 1, a block diagram of an exemplary implementation of a system for fraud detection is shown, in accordance with various embodiments of the present disclosure. As can be seen from FIG. 1, an enterprise call center 100, a fraud detection system 102, and a plurality of callers 104 are shown. The call center 100 may receive and process calls on behalf of an enterprise. The enterprise may include a merchant, an insurance company, an affiliate of a company, a bank, a telecommunication company, a cellular service provider, a credit card company, a credit card service company, and the like.

According to some embodiments, the call center 100 may receive calls from the plurality of callers 104 (hereinafter "the callers 104") for goods and/or services provided by the enterprise. The callers 104 may call the call center 100 using a VoIP/Public Switched Telephone Network (PSTN)/mobile network 106A. The calls from the callers 104 may enter an automatic call distributor 108, which distributes calls across individual agents 110*a-n*. Calls events may be recorded by a recording device 112 of the call center 100 and later processed for fraud detection. It will be understood that the callers 104 may include legitimate customers and fraudsters.

The callers 104 may request call center agents (who receive phone calls) to process transactions related to goods/services. In some embodiments, the call center 100 may apply one or more business rules to decide whether to process a transaction directly or to have a fraud check performed on the caller.

The term "call data" for a call event or a segment of the call event may be understood to include not only audio data (e.g., audio signals, or call audio data) for the call event, but non-audio data for the call event as well. The term "call audio data" for the call event or segment of the call event may be understood to include the audio portion of the call data (e.g., audio signals). "Call audio data," "audio sample," "audio signal," and "audio data" may be used interchangeably. The above-described examples of audio signal data are to be understood to be non-limiting, and one of ordinary skill in the art will appreciate that many other types of audio signal may likewise be utilized in accordance with the present technology. Additionally, audio information or data may be extracted from call audio data including both speaker models (or voice models) that represent the voice of a speaker and channel models that represent a communication profile of an audio path for a channel used by the speaker. The communications profile may include noise models, background noise, transfer path functions (also referred to as call transfer profiles, as will be described in greater detail infra), as well as other representative characteristics that may be determined for a communications channel that would be known to one of ordinary skill in the art.

It will be understood that the channel model for a segment of call audio data may be sufficiently unique to determine that two separate segments of call audio data belong to two separate speakers. For example, a customer calling into an enterprise may have a channel model that is inherently distinctive relative to the channel model associated with call center agents of the enterprise. Therefore, differences in channel models may alone suffice as a basis for diarizing and separating segments of call audio data. Similarly, differences in amplitude may be used as a basis for diarizing the call audio data.

The term "speaker model" may be understood to include a voice model representing the unique characteristics of an individual's voice, and/or a language model representing linguistic characteristics of the speaker. The voice model may include a collection of features that are extracted from an audio signal, of the individual's voice, and encoded within a specific statistical framework. In various embodiments, these features include cadence, tone, rate of speech, spectral characteristics, and/or other descriptive information about the voice and vocal track of the speaker that describes the speaker (separately from the words spoken). Other synonyms for a voice model may include, but are not limited to, a voice signature, a voice print, speaker model, a voice portion of a speaker model, and also in some instances, simply a speaker voice.

In various embodiments, the language model is comprised of features or characteristics (such as the words spoken and speech choices made by the speaker) and a statistical framework for encoding those features. Examples of a statistical framework include the probability of an occurrence of a string of words, and how that probability is calculated. In various embodiments, the language model includes language(s) spoken, word choice, word order, accent, grammar, diction, slang, jargon, rate of speech, and/or the like. It is noteworthy that in some instances information in addition to a speaker model (voice model and language model) can be extracted from diarized call audio data. For example, a channel model may be extracted from diarized call audio data, as described elsewhere herein. Further, word spotting or word recognition may be used to extract non-audio data, for example, name, account number, social security number, address, and/or the like from diarized call audio data.

In some embodiments, all callers are recorded automatically using the ACD 108, and an audio signal and/or non-audio data is stored for all calls. Additionally, the audio signal may be time stamped. Call audio data may be streamed for processing in real time and/or recorded and stored for processing. In some embodiments, the audio signal is streamed or processed without being recorded. For example, the audio signal may be routed directly from the ACD 108 to the file transfer server 118. In other embodiments, a portion of the calls are recorded and/or stored.

The present technology may also enroll diarized voice signals determined to correspond to a fraudster into a blacklist that includes speaker/channel models determined to be associated with fraudsters. For additional details regarding the enrollment of speaker models into a blacklist see, e.g., U.S. patent application Ser. Nos. 11/404,342, 11/754,974, 11/754,975, 12/352,530, 12/856,037, 12/856,118, 12/856,200, which are all hereby incorporated by reference herein in their entireties. Similarly, the present technology may enroll the diarized channel signals determined to correspond to a fraudster into a blacklist that includes channel models determined to be associated with fraudsters.

Customer accounts for each legitimate customer may be stored in an account database 114. Additionally, call data (including call audio data and/or call non-audio data) for call events may be stored in the account database or may be linked to the customer account via a screening identification that associates a particular call event with a customer account. Therefore, both legitimate and fraudulent call data events may be linked to the customer account.

In some embodiments, the call center 100 includes a fraud management system 116 that receives data indicative of potential or actual fraudulent activities from the FDS 102. The fraud management system 116 may utilize the fraud data provided by the fraud detection system 102, along with other enterprise-specific information, to process and remedy fraudulent account activity.

A file transfer server 118 of the call center 100 may communicate recorded call data and/or streamed call data to the FDS 102 using Internet/LAN 106B. The Internet/LAN 106 may utilize a secure communications protocol. File transfer server 118 may communicate call audio data and/or call non-audio data to a diarization system 120, via an application programming interface ("API") or any other suitable data transmission protocols, which may be secured or insecure. File transfer server 118 may also received diarized data back from the diarization system 120 via the same communications protocols. Additional operational details of the diarization system 120 are described in greater detail with regard to FIG. 2.

It will be understood that the FDS 102 may detect any type of fraud. However, for the purposes of brevity, the present disclosure focuses on fraud perpetrated by fraudsters utilizing telephonic devices. While not shown, the FDS 102 may include additional modules or engines that determine fraud and generate fraud reports. Additional details regarding the FDS 102 have been omitted so as not to obscure the description of the present technology. See, e.g., U.S. patent application Ser. No. 13/415,816, filed Mar. 8, 2012, entitled "SYSTEMS, METHODS, AND MEDIA FOR GENERATING HIERARCHICAL FUSED RISK SCORES," and U.S. patent application Ser. No. 13/415,809, filed Mar. 8, 2012, entitled "SYSTEMS, METHODS, AND MEDIA FOR DETERMINING FRAUD RISK FROM AUDIO SIGNALS," all of which are hereby incorporated by reference in their entirety herein.

Speaker models and/or channel models may be enrolled in one or more fraudster databases/blacklists and may be used as a corpus that may be queried against for comparing voice and/or channel data of a candidate audio sample. The enrollment of speaker models into a fraudster database may use one or more precursor fraud databases. Speaker models may be extracted from audio in a precursor fraud database that is associated with the matched audio sample identifiers and enrolled into a fraudster database.

A precursor fraud database may be seeded with diarized audio samples and associated audio sample identifiers collected without regard to fraudulent activity associated with the audio samples. The audio sample identifiers may be matched with identifiers in a fraud report. Further details regarding precursor fraud databases well as the enrollment of fraudster voice signature/speaker models into a fraudster database/blacklist using precursor fraud databases are described in U.S. patent application Ser. Nos. 11/404,342, 11/754,974, 11/754,975, 12/352,530, 12/856,037, 12/856,118, 12/856,200, all of which are hereby incorporated by reference in their entirety herein. Channel model enrollment may be performed in a similar manner to speaker model enrollment, as described in these U.S. Patent Applications.

The audio sample identifiers (e.g., non-audio data) may include any type of information that links the audio signal with the fraud identifiers. In various embodiments, the audio sample identifiers include one or a combination of a call identifier, a customer account, a timestamp, identity information (name, social security number, etc.), agent information, agent communications device (e.g., cellular telephone, landline, and computing system that communicates via VoIP protocols) and/or the like. Information for a communications device may include data such as ANI, IMEI, caller identification, and so forth. As will be discussed below, channel models extracted from audio in the precursor fraud database that is associated with the matched audio sample identifiers may be enrolled into the fraudster database in a manner similar to speaker models.

In some embodiments, the FDS 102 includes the diarization system 120. The diazization system 120 may be utilized to leverage business logic within diarization processes to separate call audio data for unique speakers from combined call audio data output. These diarized audio files may be subsequently processed to determine if the unique speaker in the audio file is associated with a fraudster, a call center agent, or a legitimate customer.

Figure 2:
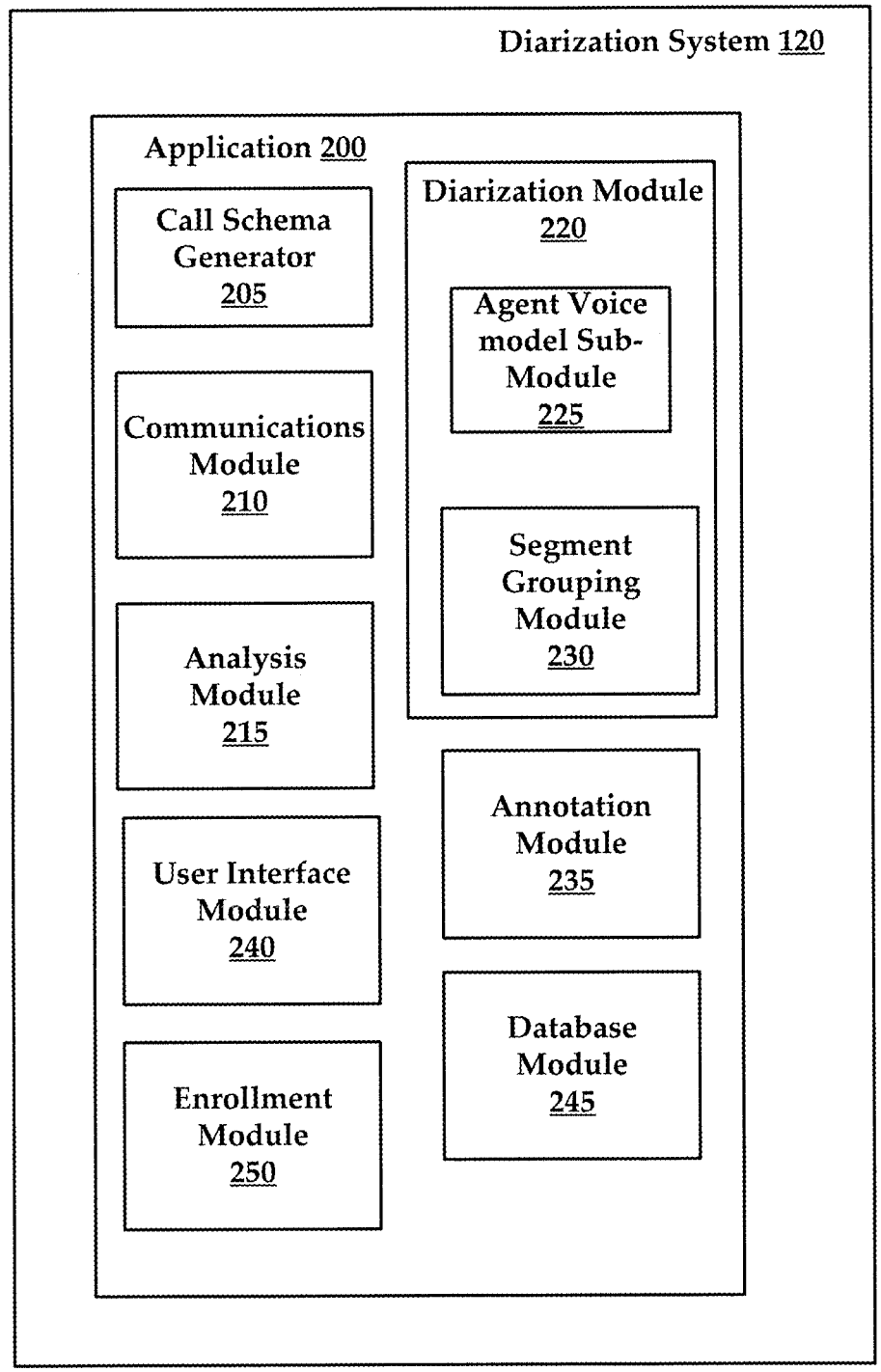
FIG. 2 is a block diagram illustrating an exemplary architecture of a diarization system for use in accordance with the present disclosure.

FIG. 2 is a block diagram of an exemplary diarization system 120 that includes a diarization application, hereinafter application 200. The application 200 may reside in memory (e.g., memory 520 of computing system 500, described in more detail elsewhere herein) of the diarization system 120. The diarization system 120 may execute the application 200 using a processor (e.g., processor 510) to perform the functionalities attributed thereto.

Generally speaking, the application 200 may include a call schema generator 205, a communications module 210, an analysis module 215, a diarization module 220 that includes an agent voice model sub-module 225, a segment grouping module 230, an annotation module 235, a user interface module 240, a database module 245, and an enrollment module 250.

It is noteworthy that the diarization system 120 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational module circuit, and/or other suitable components that provide the described functionality. In other embodiments, individual modules of the diarization system 120 may include separately configured web servers.

In some embodiments, the diarization system 120 may be implemented in a cloud computing environment. Generally speaking, a cloud computing environment or "cloud" is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo™; or such systems may be accessible to outside users who deploy applications within the computing infrastructure to obtain the benefit of large computational or storage resources.

The cloud may be formed, for example, by a network of servers with each server providing processor and/or storage resources. These servers may manage workloads provided by multiple users (e.g., cloud resource customers or other users). Typically, each user may place workload demands upon the cloud that vary in real-time, sometimes dramatically. The nature and extent of these variations typically depends on the type of business associated with the user.

The present technology leverages the computational resources of distributed computing (e.g., cloud computing systems) to facilitate efficient diarization of call audio data.

It is envisioned that the diarization system 120 may cooperate with the FDS 102 or may, in some embodiments, function as a stand-alone diarization system that may be utilized by an enterprise, separate from the FDS 102.

In other embodiments, a portion (or potentially all portions) of diarization system 120 may be integrated into FDS 102, while in other embodiments, the constituent modules of the diarization system 120 may be remotely distributed from one another in a remote computing arrangement, wherein each of the modules may communicate with one another via the Internet 106 utilizing any one (or combination) of a number of communications protocols or communications mechanisms (e.g., API, HTTP, FTP, etc.).

According to some embodiments, prior to diarization of call audio data, the present technology may execute the call schema generator 205 to generate call schemas that include rules associated with business logic. In some instances these rules may represent particular attributes of call scenarios for an enterprise. The call schema may function as a template that may be queried against, for example, to compare with call attributes of call audio data. The template may include a vast array of different types of information that defines particular call attributes for common call scenarios. For example, a call scenario may describe data associated with outbound sales calls. Characteristics for the outbound sales call that define the call schema may include that the first speaker will be the customer, typically followed by a response from the call center agent. The outbound sales call may also include information such as common outbound telephone numbers, or a typical time frame associated with outbound sales calls. In some embodiments, the call schema generator includes one or more voice models that may be used for identifying segments of audio containing one or more known speakers (e.g. call center agents) in the call audio data. Using this information, the analysis module 215 may be able to quickly identify the first unique speaker as the customer.

Other information that may be included in the call schema may include keywords that will frequently be spoken by a call center agent, such as with a call script. Other types of call schema information may include expected call duration, call time data, telephone number, automatic number identification ("ANI"), and so forth. One of ordinary skill in the art will appreciate the vast amount of information that may be utilized to define a call schema. Regardless of the type of information included in the call schema, the present technology may apply the rules associated with the call schema to diarization processes to produce more efficiently diarized audio files.

Many types of call schema may be generated by the call schema generator 205 for an enterprise, depending upon the various functions performed by the enterprise. As such an enterprise may have several call schemas for inbound/outbound sales calls, technical support calls, general inquiry calls, and so forth.

In some embodiments, the call schema generator 205 may cause the user interface module 240 to display the generated call schemas to allow for manual review of the same. End users may modify a call schema generated by the call schema generator 205 if errors are determined in the call schema, or if the end user desires to include additional business rules in the call schema.

In some instances, an enterprise may be engaged to provide a limited or known function, such as outbound sales calls. In these instances, the call schema generator 205 may only generate a single call schema that may be applied to each instance of call audio data received.

After the establishment of one or more call schema by the call schema generator 205 and upon receiving call audio data by the communications module 210, the analysis module 215 is then executed to apply at least one call schema for the received call audio data. It is noteworthy to mention that an enterprise may only utilize a single call schema, so in some instances, the call schema may include a default call schema.

The analysis module 215 may parse the call data (e.g., into segment) to determine call characteristics that indicate the type of call schema that is to be applied to the call audio data. For example, the call data may include data such as an inbound phone number for the call audio data. It may be inferred that the only calls received by this particular inbound phone number are directed to billing inquiries. Therefore, an inbound billing inquiry call schema may be applied to the diarization process, as described in greater detail below.

The analysis module 215 may also process and/or parse the call audio and/or non-audio data to determine call characteristics of the call data such as the presence and number of unique speakers, call transfer functions, audio quality, compression techniques, speech distribution, speaker accents, and so forth. Moreover, the analysis module 215 may determine segment lengths for each unique speaker and/or segments with unique channel models, and the chronological position of each segment relative to the overall timeline of the call data. A segment may include a period of the call data that is initiated when a unique voice is detected and ends when the unique voice terminates. This type of temporal data can be utilized to infer the role of a particular speaker in view of the call schema applied during diarization. For example, a call center agent may be expected to do a majority of the talking while reading long passages of terms and conditions. Thus, an identity of a voice as a call center agent or a customer may be inferred from a percentage of the talking performed by that voice during the call event or portion of the call event.

Additionally, the analysis module 215 may determine keywords, bigrams, n-grams, or other collections of words in the call audio data that may be utilized to determine the role of a unique speaker. For example, if it is determined that a segment of call audio data includes a recitation of terms and conditions of a purchase, it may be inferred that the segment is associated with a call center agent.

Call transfer functions or profiles characterize the changes to an audio signal as it traverses a path through a channel from the source to the analysis module 215. For example, the call transfer profile of a microphone may characterize the microphone as an attenuator and/or a band-pass filter that includes roll off or clipping of frequencies outside of a range (e.g., the range 100 Hz-5,000 Hz). In another example, the analysis module 215 may use a call transfer profile characteristic of a voice changer to determine the presence or use of a voice modifier. If the analysis module 215 detects use of a voice modifier, the call audio data may be immediately flagged as being associated with a fraudster. A call transfer profile may also be used to detect the presence and types of compression used in the path of the audio. Thus, a call transfer or profile may indicate the type of communications channel(s) and/or communications devices that were utilized by a caller. See, e.g. U.S. patent application Ser. No. 13/415,809 for further details of call transfer functions or profiles.

Call data may also be gathered by the analysis module 215 from data associated with the call audio data, such as time stamping, annotated notes generated by call center agents, and so forth.

Utilizing the call schema and the call characteristics for the call audio data, the diarization module 220 may be executed to efficiently diarize the call audio data. Diarization of call audio data may begin by separating the call audio data into segments that belong to unique speakers using the call schema. The diarization module may identify the segments as belonging to various speakers. Multiple segments may be associated with a single speaker. The diarization module may group the segments belonging to a specific speaker.

The diarization module 220 may execute the segment grouping module 230 which uses the schema to identify segments containing various speakers. In some applications, the diarization module 220 may execute the agent voice model sub-module 225 which uses the schema to identify segments containing a call center agent. For example, the agent voice model sub-module 225 may compare the call audio data, or individual segments of call audio data to one or more voice models in a database of agent voice models. Agent voice models may be generated and managed for each call center agent (or a subset of call center agents) for an enterprise. The voice model may be generated from a single audio file or may include a plurality or sampling of a plurality of audio data points for a particular agent that may be combined into an agent voice model. In some instances, the agent voice model is associated with an agent identifier (e.g., agent ID) that may be annotated into or associated with call data generated from call events in which the call center agent participated. Such identifying information may be utilized by the agent voice model sub-module 225 and/or segment grouping module 230 in detecting and removing segments associated with a call center agent.

If the call audio data includes one or more segments that substantially correspond to an agent voice model, the agent voice model sub-module 225 and/or segment grouping module 230 may annotate the segment as being associated with a call center agent. Alternatively, the agent voice model sub-module 225 and/or segment grouping module 230 redact the segment as being associated with a call center agent. In some instances, when the agent voice model sub-module 225 compares a segment to an agent voice model, the agent voice model sub-module 225 may determine that the segment is statistically likely to correspond to an agent voice model based upon discrepancies between the segment and the voice model. These discrepancies may be expressed as a percentage of difference and compared against a threshold value. For example, only segments that have a high probability (greater than 95%) of corresponding to an agent voice model may be redacted, whereas segments that have a lower probability may be annotated for further review.

Additionally, similar probabilistic analyses may be performed on agent audio in the creation of a composite agent voice model. For example, the sub-module 225 may evaluate fifty segments that are potentially attributable to a call center agent. These segments may each be compared to a verified voice model for the agent and only segments that have a high probability of corresponding to the call center agent will be utilized to generate the composite voice model. In this way, the agent voice model sub-module 225 may update the voice model for the agent over time.

In addition to the use of agent voice models, the present technology may utilize other types of profiles that represent call audio that can be redacted from the call audio data. Non-limiting examples of profiles include a music profile, a prompt profile, an advertisement profile, and a channel profile—just to name a few. Specifically, the music profile may include audio characteristics for the on-hold music played during the call event, which also may include words included in the on-hold music, as well as determining spoken words immediately following the playing of music. Similar profiles may be created from audio present in system prompts such as automated directory information or dial-by-number audio prompts. The diarization module 220 may recognize segments that correspond to a profile and remove such segments during diarization. Also, in some instances, channel models or certain channel model characteristics, such as noise, may also be removed.

In some embodiments, the diarization module 220 is configured to utilize the call characteristics gathered by the analysis module 215, along with other types of data determined by the agent voice model sub-module 225, to remove segments of call audio data that are not of interest (e.g., segments belonging to agents, on-hold music, prompts, announcements, advertising, etc.)

The segment grouping module 230 of diarization module 220 is configured to identify segments as belonging to unique callers using the call schema. The segment grouping module 230 may group together segments belonging to unique callers into individual audio files. For example, the segment grouping module 230 may be executed to collect and/or splice together segments for a unique speaker into a single audio file.

The annotation module 235 may be executed to associate non-audio data with the segments. The segment grouping module 230 may use schema and the associated non-audio data to identify various speakers of the segments.

Once audio segments have been grouped together by the segment grouping module 230, the grouped segments may be analyzed to determine if there is a match with a fraudster, e.g., using the fraud detection system 102. If a match is found between the grouped segments and a fraudster, the fraud management system 116 may notify a merchant or other third party. The fraud management system may further extract a voice model and enroll for enrollment into a fraudster database. The analysis may be performed in real time, near real time, and/or on data that has been recorded and stored.

The grouped segments may be stored in a storage media, in the form of a file store, such as database 114 of FIG. 1. The segments may be stored by the database module 245. The grouped segments, may be displayed in a visual and/or audio format via the user interface module 240. The proposed diarizations of call audio data may be displayed via the user interface module 240 such that end users may manually review, modify, and/or approve a diarization of the call audio data. That is, one or more segments may be indicated as belonging to a particular speaker, and each segment may include data indicative of the segment such as a time stamp, a link to a matching voice model (e.g., potentially a fraudster or agent), and so forth. The segments may be arranged in chronological order. In other embodiments, the audio files generated by the segment grouping module 230 may be displayed concurrently with the visual representation of call audio data.

Manual verification may reduce the likelihood that the enhanced diarization methods described herein may produce errant diarized audio files. Modifications or approvals of proposed diarizations may be fed back into the logic utilized by the analysis module 215 to vary and/or enhance the manner in which future analysis/diarization processes are executed.

During manual verification, the annotation module 235 may be executed to receive annotations corresponding to changes received from end user input. The annotation module 235 may cooperate with the database module 245 to ensure that descriptive information concerning the manual verification processes is memorialized. These annotations may include a change log for a segment or an audio file that includes time stamps for each modification, agent identification, nature of modification, call identification information, identification tags for voice signatures, and the like.

The database module 245 may also be executed to manage the aforementioned call profiles and cooperate with the agent voice model sub-module 225 to manage the storage and access to agent voice models. The database module 245 may store segments, audio files, voice models, profiles, or any other disclosed data in a database, such as database 114, although the diarization system 120 may also include a local storage medium.

Diarized audio files including grouped segments may be transmitted to the FDS 102 and compared against a blacklist that includes voice models associated with known fraudster. If an audio file substantially corresponds to a voice model associated with a fraudster, a signal or warning notification may be relayed back to the call center 100.

Segments of audio may be analyzed by the FDS 102 in real time as they are diarized and even before separation and/or identification of other segments has been completed. In instances where diarization and fraud detection preferably occur during the duration of a call event and a match between an audio file and a fraudster voice model has been detected by the FDS 102, the diarization process may be terminated after notification has been relayed back to the call center 100. The notification may be communicated directly to the call center agent involved in the call event. The notification may be communicated before completion of diarizing the entire call event.

Therefore, in some embodiments, the diarization process may only require analysis of a subset of the segments and subjecting those segments to fraud detection processes until a fraud determination can be reached for the call event. As such, an entire audio file may not be diarized and/or generated for each unique speaker.

Once a match between grouped segments and a fraudster has been determined, the enrollment module 250 may enroll the grouped segments directly into a fraudster database. As stated previously, the enrollment of voice models in a fraudster database/blacklist creates a fraudster database that may be used as a corpus of voice models that may be queried against for comparing a voice models (voice signatures or voiceprints) of a segment to voice models for known fraudsters. The voice model includes a set of voice characteristics that uniquely identify a person's voice. In one embodiment, each voice model in the fraudster database may be assigned an identifier (ID). The ID may be unique. In addition, attributes may be associated with the fraudster, such as a social security number or a credit card number that the fraudster has used.

The enrollment of voice models may include populating one or more precursor fraud databases using the voice models and associated ID without regard to fraudulent activities. Then a fraud identifiers in a fraud report may be compared to ID's associated with voice models in the precursor database to populate a fraudster database. See, e.g., U.S. patent application Ser. No. 11/404,342.

Additionally, similarly to agent voice models, the present technology may utilize the correspondence between audio segments and fraudster voice models to compare the correspondence values to thresholds. Voice models for segments or audio files that have a high probability of correspondence to a voice model for a fraudster may be annotated or immediately flagged as indicating a potential fraudster. Additionally, channel models indicative of a channel characteristic for a segment of call audio data may also be flagged as indicating a potential fraudster. See, e.g., U.S. patent application Ser. No. 13/415,816. For example, a channel model may indicate that the call originated from a cellular telephone in a particular country. Because cellular telephones originating from a particular country may indicate potential fraud, the segment(s) originating from that country may be flagged for further review.

Figure 3:
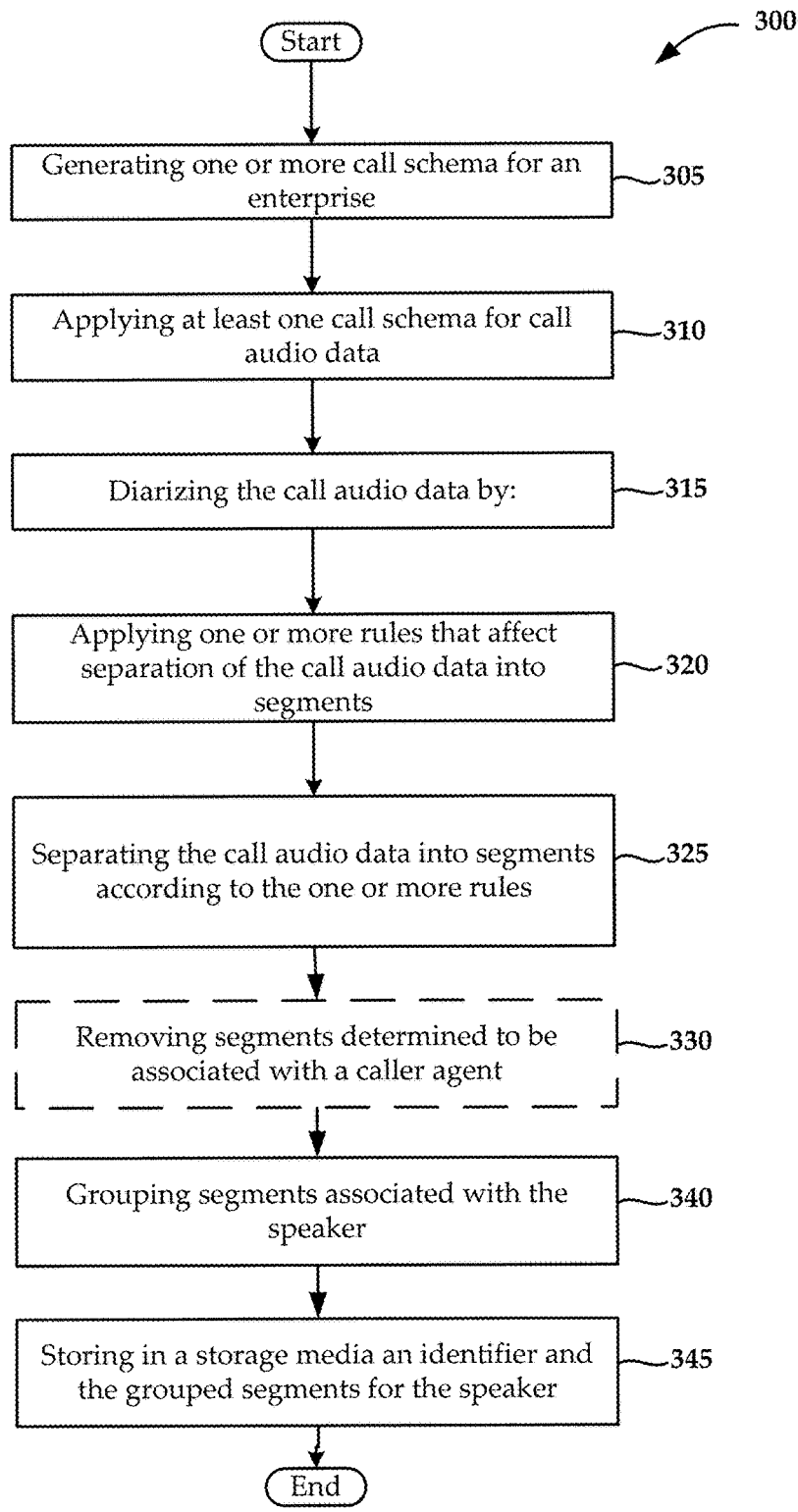
FIG. 3 is a flowchart of an exemplary method for diarizing call audio data.

FIG. 3 is a flowchart of an exemplary method 300 for diarizing call audio data. The method 300 may include a step 305 of generating one or more call schemas for an enterprise. Upon generating the call schema, the method 300 may include the step 310 of applying at least one call schema for call audio data. This step 310 may include comparing call characteristics for the call audio data to a plurality of call schema and selecting an appropriate call schema to apply to the diarization of the call audio data.

Next, the method 300 may include a step 315 of diarizing the call audio data by executing a step 320 of applying one or more rules that affect separation of the call audio data into segments. It is noteworthy that the rules may be associated with the at least one call schema. Also, diarization may include a step 325 of separating the call audio data into segments according to the one or more schema rules.

The method 300 may include an optional step 330 of redacting or removing segments determined to be associated with a call center agent. The method 300 further includes a step 340 of grouping segments associated with the speaker. Finally, the method 300 includes a step 345 of storing in a storage media an identifier and the grouped segments for the speaker.

It will be understood that the method 300 may include additional or fewer or steps that those listed above. Additionally, optional steps have been shown as dotted lined objects in the Figures.

Figure 4:
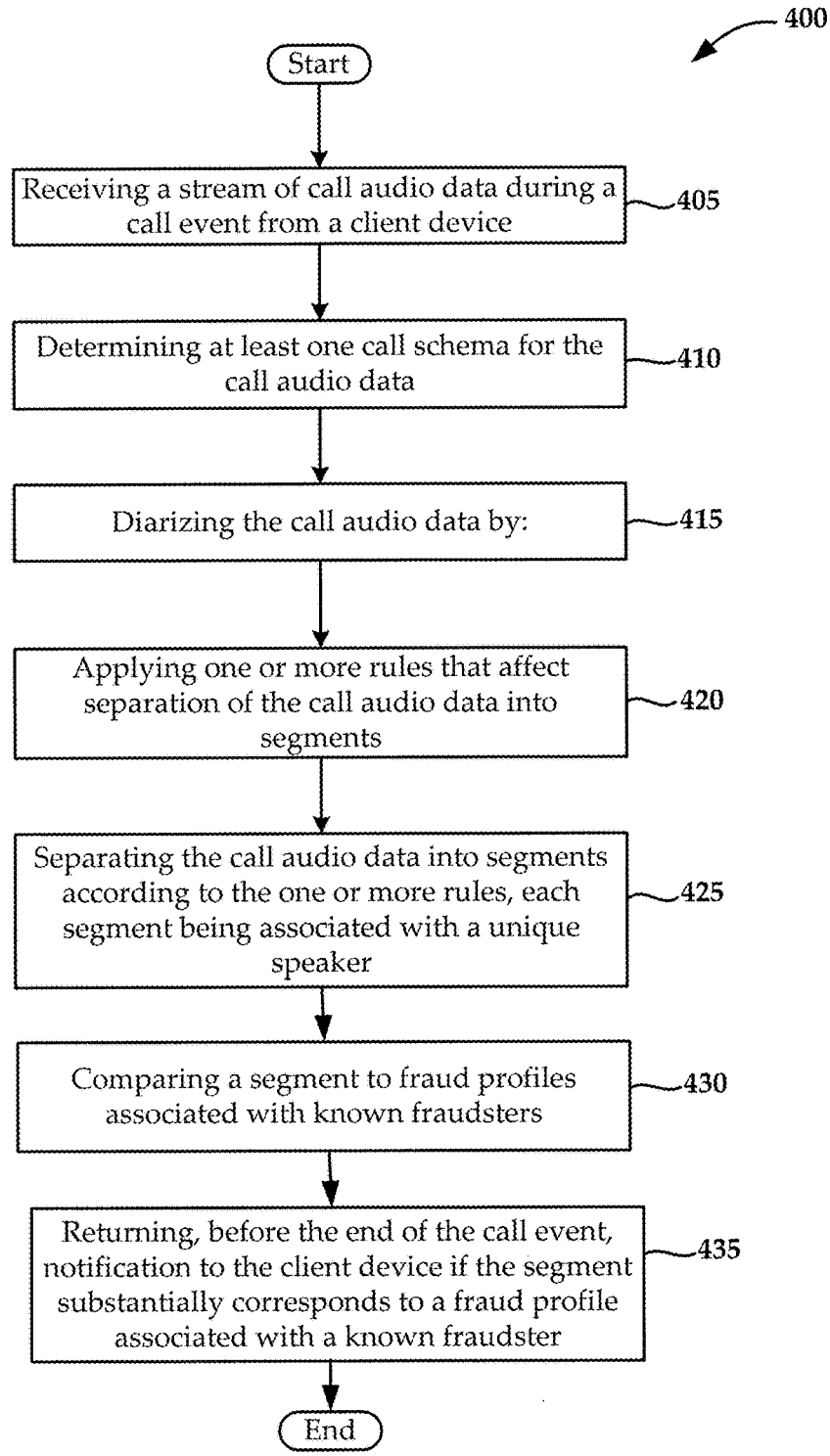
FIG. 4. is a flowchart of an exemplary method for processing call audio data.

FIG. 4 illustrates a flowchart of an exemplary method 400 for processing call audio data. The method 400 may include a step 405 of receiving a stream of call audio data during a call event from a client device. Next, the method 400 may include a step 410 of determining at least one call schema for call audio data, followed by a step 415 of diarizing the call audio data.

As with the method 300 above relative to FIG. 3, diarization may include a step 420 of applying one or more rules that affect separation of the call audio data into segments. It is noteworthy to mention that the rules may be associated with the at least one call schema. Additionally, diarization may include a step 425 of separating the call audio data into segments according to the one or more rules, where each segment is associated with a unique speaker.

Next, the method 400 may include a step 430 of comparing a segment to fraud profiles associated with known fraudsters before a step 435 of returning, before the end of the call event, notification to the client device if the segment substantially corresponds to a fraud profile associated with a known fraudster.

Figure 5:
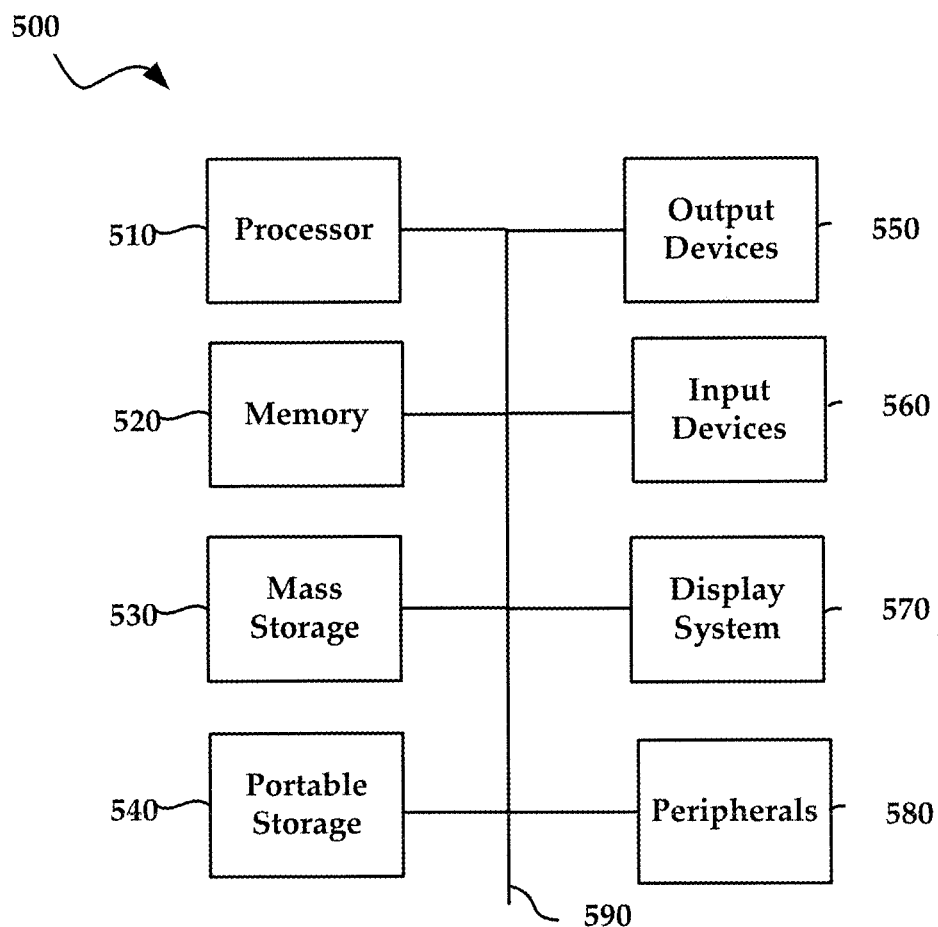
FIG. 5 is a block diagram illustrating an exemplary computing system that may be used to implement embodiments according to the present technology.

FIG. 5 illustrates an exemplary computing system 500 that may be used to implement an embodiment of the present technology. The computing system 500 of FIG. 5 may be implemented in the contexts of the likes of computing systems, clouds, modules, engines, networks, servers, or combinations thereof. The computing system 500 of FIG. 5 includes one or more processors 510 and main memory 520. Main memory 520 stores, in part, instructions and data for execution by processor 510. Main memory 520 may store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. The components may be connected through one or more data transport means. Processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 may store the system software for implementing embodiments of the present technology for purposes of loading that software into main memory 520.

Portable storage device 540 operates in conjunction with a portable non-volatile storage medium, such as a floppy disk, compact disk, digital video disc, or USB storage device, to input and output data and code to and from the computing system 500 of FIG. 5. The system software for implementing embodiments of the present technology may be stored on such a portable medium and input to the computing system 500 via the portable storage device 540.

Input devices 560 provide a portion of a user interface. Input devices 560 may include an alphanumeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Display system 570 may include CRT, a flat panel display, a liquid crystal display (LCD) or other suitable display device. Output device 550 may receive textual and/or graphical information, and process the information for output to the display system 570.

Peripherals 580 may include any type of computer support device to add additional functionality to the computing system. Peripheral device(s) 580 may include a modem or a router.

The components provided in the computing system 500 of FIG. 5 are those typically found in computing systems that may be suitable for use with embodiments of the present technology and are intended to represent a broad category of such computer components that are well known in the art. Thus, the computing system 500 of FIG. 5 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

Embodiments of the invention include method for analyzing call audio data, the method comprising receiving call audio data from a client, the call audio data including a first speaker and a second speaker; receiving a call schema for call audio data; separating the call audio data into segments using the call schema; using the call schema to determine for each segment of the call audio data if the segment is from the first speaker or the second speaker; collecting separated segments for the first speaker; storing the collected audio data segments associated with the first speaker in a database; wherein the first occurring audio data segment in the call audio data is from the second speaker; further comprising storing an identifier associated with the first speaker in the database; wherein the call audio data further includes a third speaker; wherein the collected audio data segments are stored as a list of time periods identifying when each of the audio data segments occurred in the call audio data; wherein the collected audio data is channel audio data; further comprising comparing a speaker identifier associated with the first speaker to a fraud identifier associated with a fraud event; and storing a channel model for the channel audio data in a fraudster database if the speaker identifier matches the fraud identifier; wherein the call audio data is received from the client during a phone call between the client and the first speaker; further comprising comparing the collected audio data for the first speaker to channel models in a fraudster database, during the phone call; and notifying the client if the channel audio data matches a channel model in the fraudster database during the phone call; wherein the collected audio data is voice audio data; wherein the call audio data is received from the client during a phone call between the client and the first speaker; further comprising comparing the collected audio data for the first speaker to voice models in a fraudster database, during the phone call; and notifying the client during the phone call if the collected audio data matches a voice model in the fraudster database; wherein the stored audio data is a channel model based on collected audio data; wherein the stored audio data is a voice model based on collected audio data.

Embodiments of the invention include a method for processing call audio data, the method comprising maintaining a database of call characteristics for a call schema; maintaining a database of call models; receiving a stream of call audio data and call non-audio data collected during a call event from a client device; selecting a call characteristic based on the received call non-audio data using an analysis module; separating call audio data into segments using the call schema, based the selected call characteristics using a diarization module; comparing separated segments to voice models associated with fraudsters to generate a risk score indicative of fraud; and returning notification of the risk score during the call event to the client device if one or more compared segments match a voice model associated with a fraudster; wherein the call model includes an agent model, a music module, a system prompt, a voice model, a channel model, an announcement, a language model, an agent channel model, an agent voice model, a fraudster voice model, a fraudster channel model, or a advertisement; wherein the call characteristics non-audio data includes an agent ID, identification of the call as an inbound call, identification of the call as an outbound call, and ANI, identification of the call as part of a queue, or a call identifier; further comprising evaluating the separated segments to determine speaker scores based on the call schema and collecting evaluated segments belonging to a speaker based on the speaker scores of the segments.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While certain exemplary embodiments have been described and shown in the accompanying drawings, it is to be understood that such embodiments are merely illustrative and not restrictive of the broad disclosure and that this disclosure is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method for processing call audio data, the method comprising:
   receiving a stream of call audio data collected during a call event between an agent and a caller;
   separating the stream of call audio data into segments based on a call schema;
   extracting, for each segment, a channel model that describes how the call audio data has been affected by the channel through which the call audio data has been communicated, wherein an agent's channel model is distinct from a caller's channel model;
   comparing channel models for each segment;
   grouping segments corresponding to the caller based on the comparison;
   identifying the caller as a fraudster by comparing the channel models in the group of segments corresponding to the caller to channel models stored in a fraudster database;
   transmitting to the agent a notification if the caller is a fraudster; and
   enrolling the grouped segments into the fraudster database.

2. The method of claim 1, wherein the channel model represents a communication profile of a voice changer.

3. The method of claim 1, wherein the channel model indicates that the call audio data originated from a cellular telephone.

4. A method for diarizing call audio data, the method comprising:
   receiving a call schema for call audio data; and
   diarizing the call audio data by:

applying one or more rules that affect separation of the call audio data into segments, the rules being associated with the received call schema, separating the call audio data into segments according to the one or more rules, extracting a channel model from each segment that describes how the call audio data has been affected by the channel through which the call audio data has been communicated, grouping the segments by speaker based on each speaker's channel model, identifying a speaker as a fraudster by comparing the channel models in the group of segments corresponding to the speaker to channel models stored in a fraudster database, and creating an audio file for each group of segments.

5. The method of claim 4, wherein the channel model indicates that the call audio data originated from a cellular telephone.

6. A system for diarizing call audio data, the system comprising:

a memory for storing an executable instructions that diarize call audio data;

a processor that executes the instructions;

a diarization module stored in memory and executable by the processor to:

receive a call schema for call audio data, apply one or more rules that affect separation of the call audio data into segments, the rules being associated with the received call schema, separate the call audio data into segments according to the one or more rules, group the segments by speaker based on each speaker's channel model, and create an audio file for each group of segments; and an analysis module stored in memory and executable by the processor to:

determine a channel model for each segment, wherein the channel model describes how the call audio data has been affected by the channel through which the call audio data has been communicated, and compare the channel models in a group of segments corresponding to a speaker to channel models stored in a fraudster database to identify the speaker as a fraudster.

7. The system according to claim 6, further comprising a database module stored in memory and executable by the processor to store in a non-transitory storage media the grouped segments for each speaker.

8. The system according to claim 6, further comprising an enrollment module stored in memory and executable by the processor to store the speaker's channel model in a fraudster database if the speaker is associated with an instance of fraud.

9. The method of claim 6, wherein the channel model indicates that the call audio data originated from a cellular telephone.

10. A non-transitory computer readable storage media having a program embodied thereon, the program being executable by a processor to perform a method for diarizing call audio data, the method comprising:

determining at least one call schema for call audio data; and diarizing the call audio data by:

applying one or more rules that affect separation of the call audio data into segments, the rules being associated with the at least one call schema; and separating the call audio data into segments according to the one or more rules;

extracting a channel model from each segment that describes how the call audio data has been affected by the channel through which the call audio data has been communicated;

grouping the segments by speaker based on each speaker's channel model;

identifying a speaker as a fraudster by comparing the channel models in the group of segments corresponding to the speaker to channel models stored in a fraudster database; and creating an audio file for each group of segments.

11. The method of claim 10, wherein the channel model indicates that the call audio data originated from a cellular telephone.

* * * * *